Figure 1:
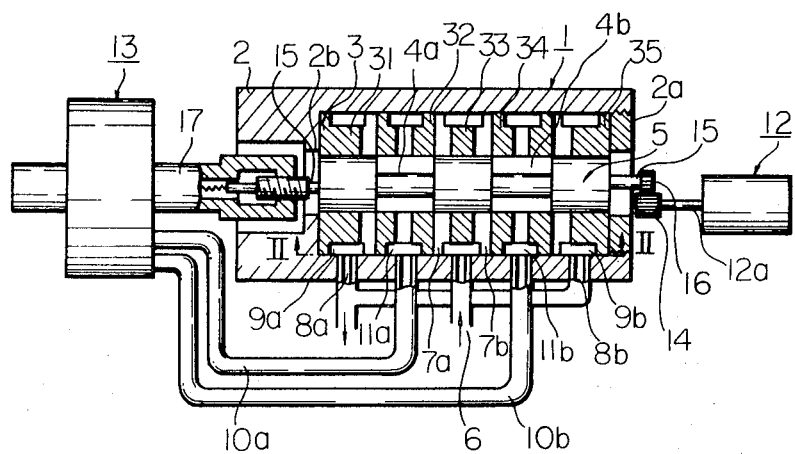

United States Patent [19]
Ikebe et al.

[11] 3,721,266
[45] March 20, 1973

[54] ROTARY PILOT VALVE

[75] Inventors: Yo Ikebe; Jun Ikebe, both of Tokyo; Seiuemon Inaba, Kawasaki-shi, all of Japan

[73] Assignee: Fujitsu Limited, Kawasaki-shi, Japan

[22] Filed: Nov. 18, 1970

[21] Appl. No.: 90,638

[30] Foreign Application Priority Data

Nov. 19, 1969 Japan ..............................44/109822
Nov. 19, 1969 Japan ..............................44/109823

[52] U.S. Cl. .........137/625.69, 251/205, 137/625.34
[51] Int. Cl..............................................F16k 11/00
[58] Field of Search.......137/625.69, 625.68, 625.67, 137/625.21, 625.65, 625.6, 625.64, 625.3, 625.34, 625.35, 625.48; 251/359, 360, 206, 205, 282

[56] References Cited

UNITED STATES PATENTS

| | | | |
|---|---|---|---|
| 2,526,361 | 10/1950 | Johnston | 251/205 X |
| 3,472,281 | 10/1969 | Jiro Chiba et al. | 251/205 X |
| 3,002,502 | 10/1961 | Szydlowski | 137/625.69 X |
| 2,920,650 | 1/1960 | Moog, Jr. | 137/625.69 |
| 2,630,135 | 3/1953 | Johnston | 137/625.69 X |

Primary Examiner—Henry T. Klinksiek
Assistant Examiner—Robert J. Miller
Attorney—Robert E. Burns and Emmanuel J. Lobato

[57] ABSTRACT

In the rotary pilot valve of the present invention, the opening area of the port varies with a linear relation to the amount of the displacement of the spool, only when the amount of the displacement of the spool is small. In the high speed feeding range, the above-mentioned linear relation is not necessary. Accordingly, in the above-mentioned range, the ratio between the amount of the displacement of the spool and the amount of the opening area of the port has a larger quantity than the ratio in the above-mentioned linear relation.

2 Claims, 4 Drawing Figures

PATENTED MAR 20 1973　　　　　　　　3,721,266

ROTARY PILOT VALVE

The present invention relates to an improved rotary pilot valve which carries out the opening and cutting action and the change over action of the oil line by a sliding motion of a spool fitted to a sleeve.

In the numerical control system of a machine tool, a hydraulic motor is controlled by a revolution of an electric pulse motor. In the case of an apparatus provided to the load line of the above-mentioned hydraulic motor and an electric pulse motor, for example, in a rotary pilot valve, it is necessary, in some cases, that the opening area of the port varies with a linear relation to the amount of the displacement of the spool only when the displacement of the spool is small. Normally, the above-mentioned relationship is required in the speed range wherein a continuous cutting control is carried out. However, in the high speed feeding range, the above-mentioned linear relationship is not necessary.

In a conventional rotary pilot valve, the opening area of the port varies, in its full stroke process, with the linear relationship to the amount of the displacement of the spool. Accordingly, the lengths of the spool and the stroke become long, then the fabrication of the spool becomes troublesome and further, a large amount of time is required to reach its full opening state.

To overcome the above-mentioned drawback, in the rotary pilot valve of the present invention, the section of the opening portion of a port formed in the sleeve presents a narrow rectangular form in the region wherein the amount of a displacement of the spool is small, and presents a wide form, for example, a circular form in the region wherein the amount of displacement of the spool increases. That is, the above-mentioned narrow rectangular formed region is used for a continuous path control and the wide-form range is used for a positioning and a high speed feeding control.

However, it was very difficult to produce a linear portion, in the case of perforating the ports having different forms, in the circular sleeve. It was desired to easily fabricate the above-mentioned sleeve.

The object of the present invention is to provide an improved rotary pilot valve wherein the relationship between the amount of the displacement of the spool and the opening area of the port corresponding to the above-mentioned displacement increases the opening area above the predetermined region.

Another object of the present invention is to provide an improved rotary pilot valve which easily fabricates the sleeve.

Other objects and features of the present invention will more fully appear from the following description and the accompanying drawings and will be particularly pointed out in the claims.

Figure 2:
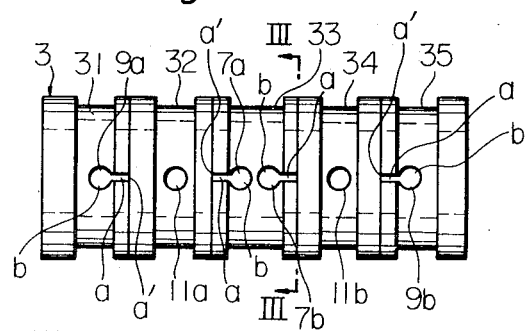
Figure 3:
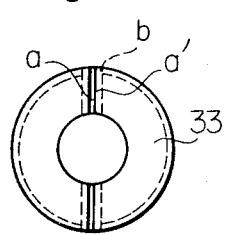
Figure 4:
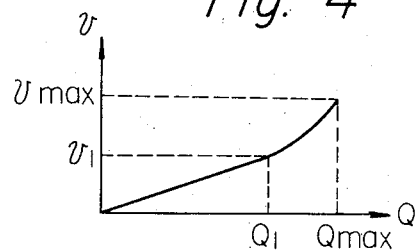

FIG. 1 is a partly omitted side view of the rotary pilot valve of the present invention, FIG. 2 is a plan view of the sleeve according to the present invention, FIG. 3 is a sectional view taken along the line III—III of FIG. 2, FIG. 4 is an explanatory diagram showing the relationship between the amount of the displacement of the spool and the opening area of the port of the rotary pilot valve of the present invention.

A specific embodiment of the present invention will now be described with reference to the accompanying drawings of the invention.

This rotary pilot valve 1 as shown in FIG. 1, is provided with a sleeve 3 tightly fitted into a housing 2, and a spool 5, having circular grooves 4a and 4b formed on its outer peripheral surface, is slidably fitted into the sleeve 3 along its axis. The sleeve 3 is provided with a pair of oil-supply ports 7a and 7b which are connected to an oil-supply line 6 and formed on either side of the central position of the sleeve, and a pair of oil-return ports 9a and 9b which are connected to the oil-return lines 8a and 8b combined at an outer side of one of the lines, and formed at the ends position of the sleeve, respectively. Between the oil-supply ports 7a, 7b and the oil-return ports 9a, 9b there are formed load ports 11a and 11b which are connected to the load-oil lines 10a and 10b. Besides, the oil-supply ports 7a and 7b are interconnected with each other in the outer periphery portion of the sleeve 3.

In the closed condition as shown in FIG. 1, the oil-supply line 6, the oil-return lines 6a, 6b and the load-oil lines 10a, 10b are closed by the spool 5 with closing of the corresponding ports.

The opened condition can be obtained through sliding displacement of the spool 5 in either direction from its position of the closed condition. Therefore, if the spool 5 is displaced in the left hand direction from the position shown in FIG. 1, hydraulic oil is supplied into the load-oil line 10b on the right side of the sleeve 3 by the hydraulic power supply, not shown, through the oil-supply line 6, the oil-supply port 7b, the circular groove 4b and the load port 11b. The supplied hydraulic oil returns via load-oil line 10a on the left side of the sleeve 3 into the oil-return line 8a on the left side of the sleeve 3 through the load port 11a, the circular groove 4a and the oil-return port 9a. If the spool 5 is displaced in the right hand direction from the position shown, the hydraulic oil is supplied into the load-oil line 10a on the left side of the sleeve 3 through the oil-supply line 6 and returns into the oil-return line 8b on the right side of the sleeve 3 via load-oil line 10b on the right side of the sleeve 3.

The construction and operation of the above-described rotary pilot valve 1 are similar to those of the known rotary pilot valves, but, as shown in FIG. 1 and especially FIG. 2, the load ports 11a and 11b of the sleeve 3 have sections of circular forms. On the other hand, the oil-supply ports 7a, 7b and the oil-return ports 9a and 9b have sections formed into a narrow rectangular portion a, in the region where the amount of the displacement of the spool 5 is small, and a circular portion b branching into the rectangular portion a, in the region where the above-described amount of spool 5 displacement is larger than a preselected value.

The rectangular portion a of the oil-supply port 7a and the oil-return port 9b on the left and right sides of the sleeve 3 are arranged on the left side of the circular portions b of their respective ports. On the other hand, the rectangular portion a of the oil-supply port 7b and the oil-return port 9a on the right and left side of the sleeve 3 are arranged on the right side of the circular portion b of their respective ports. Consequently, when the rotary pilot valve 1 is opened by way of the above-described operation, the hydraulic oil flows through the rectangular portions a only in the region where the amount of the displacement of the spool 5 is small, so that, as shown in FIG. 4, each of the ports varies in its opening area with a linear relationship to the amount of the displacement of the spool 5 and correspondingly, varies in the amount of hydraulic oil supplied and returned out of the load-oil line 10a or 10b. But in such a case where a high speed feeding motion is performed, as the amount of the displacement of the spool 5 becomes larger and as the hydraulic oil flows through the circular portion b also, that is, the opening area and the amount of the displacement pass the point defined by $\theta_1$ and $V_1$ in FIG. 4, the opening area of each of the ports suddenly increases for periods of time and the relationship between the opening area of each of the ports and the amount of displacement of the spool 5 does not maintain the linear relationship, so that the hydraulic oil, which is supplied and returned via load-oil lines 10a and 10b, also increases suddenly.

As shown from FIG. 1 to FIG. 3, especially in FIG. 2 and FIG. 3, the sleeve 3 can be divided into five cylindrical and 31, 32, 33, 34 and 35, and the second an fourth cylindrical units 32 and 34 are provided with load ports 11a and 11b, respectively, each of which is bored in each cylindrical units 32 and 34, and has a circular-formed section. The first and fifth cylindrical units 31 and 35 are provided with the return-oil ports 9a and 9b formed therein, respectively. The third cylindrical unit 33 is provided with the supply-oil ports 7a and 7b formed therein.

The return-oil ports 9a and 9b and the supply oil ports 7a and 7b have sections of different profiles which are shaped into a portion of a narrow rectangular form in the region where the amount of displacement of the spool 5 is small, and into a portion of a circular form branching into the above-described rectangular form, in the region where the above-described amount of displacement is larger than a preselected value.

The portions of a rectangular form a are arranged on the left side of the supply-oil port 7a and the return-oil port 9b, and on the right side of the supply-oil port 7b and the return-oil port 9a. The end of these portions of a rectangular form are opened at the end surface of each cylindrical unit.

The above-described cylindrical units 31 to 35 are arranged in parallel closely contacting each other in the axial direction and bonded with adhesive between each other. The bonded cylindrical units are fitted into the housing 2 and tightly fixed to a flange 2b at one end of the housing 2 by a threaded cap 2a screwed to the other end of the housing 2.

Accordingly, the portion of a rectangular form of the port formed in the cylindrical units of the sleeve 3 can be machined from each side of the end surfaces of the units with elimination of radial machining, so that machining can be performed with higher accuracy and ease. Especially, it is possible to machine an end corner a', of a cylindrically formed portion, into a sharpened condition.

The above-mentioned improved rotary pilot valve 1 is used for the electro-hydraulic pulse motor which in turn, is used for the numerical control system of the machine tool. That is, referring to FIG. 1, the rotary pilot valve 1 is connected to an electric pulse motor 12 via a toothed wheel fitted to a shaft 12a of the electric-pulse motor 12 and to a hydraulic motor 13. A pinion gear 14 mounted to a shaft 12a of the electric pulse motor 12 is engaged with a gear wheel 16 mounted on one end of a shaft 15 of the spool 5. Another end of the shaft 15, of the above-mentioned spool 5, is screwed into an end of an output shaft 17 of the above-mentioned hydraulic motor 13. The load-oil lines 10a and 10b of the rotary pilot valve 1 are interconnected to the hydraulic motor 13.

When the revolution of the electric pulse motor 12 is stopped, the rotary pilot valve 1 is closed. By the revolution of the electric pulse motor 12, the shaft 15 of the spool 5 is revolved by an engagement of the gears 14 and 16, and the spool 5 is axially displaced by the screw engaged to the output shaft 17 of the hydraulic motor 13. With a result of this, hydraulic oil is supplied via one of the load-oil lines 10a and 10b of the rotary pilot valve 1 to the hydraulic motor 13, and the hydraulic oil is returned via another one of the oil lines 10a and 10b to the hydraulic motor 13, thereby the hydraulic motor is driven towards a same direction of revolution of the electric pulse motor. The spool 5 is returned to its original position resulted by the stopping of the electric pulse motor 12 and the revolution of the output shaft 17 of the hydraulic motor 13, thereby the rotary pilot valve 1 is closed. As mentioned above, the hydraulic motor 13 is controlled by the revolution of the electric pulse motor 12. In this case, when the amount of displacement of the spool 5 is small, it is possible to supply a proportional amount of hydraulic oil to the hydraulic motor 13 in relationship to the amount of displacement of the spool 5. In the case of high speed feeding for positioning in the machine tool, the amount of hydraulic oil supplied to the hydraulic motor 13 is increased with increase of the amount of displacement of the spool 5.

As mentioned above, the section of the port on the sleeve is formed into the narrow rectangular form in the region where the amount of displacement of the spool is small, and is formed into the wide form, such as a circular form, in the region where the amount of displacement is large. As a result of this, the stroke and the length of the spool decrease and then it is possible to easily fabricate the sleeve into a small size. Further, the inertia of the spool can be reduced and then the rotary pilot valve can reach its full open-state rapidly.

What is claimed is:

1. An improved fluid control valve employable for an electro-hydraulic step motor comprising:
   a. a stationary sleeve composed of an assembly of a plurality of individual sleeve portions;
   b. a spool having a plurality of land portions and capable of axially sliding in the stationary sleeve;
   c. a first gear mounted on an end of the spool to be engaged with a second gear mounted on the output shaft of an electric pulse operated motor provided for driving the spool;
   d. a threaded connection between the other end of the spool and the inner end of the rotary output shaft of a hydraulic motor producing an output torque on the other end of the output shaft thereof;
   e. the axial length of at least one sleeve portion of said stationary sleeve being equal to the axial length of a land portion of said spool and, with each end face of said one sleeve portion being provided with at least one fluid supply port to control fluid flow and being closed by the land portion of said spool when said spool is positioned at the neutral position;

f. each of said fluid supply ports constituting a rectangular area open to said end face in its one end and, a circular area disposed at the other end of the rectangular area spaced from said end face whereby in response to an increase of the axial movement of the spool from the neutral position, one of the rectangular areas is opened and then, the circular area is opened;

g. an oil supply line; and h. oil load lines connected between said stationary sleeve and said hydraulic motor in order to supply pressure fluid introduced from the oil supply line to said hydraulic motor through either of said fluid supply ports.

2. An improved fluid control valve employable for an electro-hydraulic step motor as defined in claim 1, wherein said stationary sleeve is composed of five individual sleeve portions and said spool has three land portions.

* * * * *